3,457,762
COMPRESSION METHOD FOR MAKING A TUBULAR PRODUCT
William J. De Gain, Detroit, Mich., assignor to Arma Corporation, Ferndale, Mich., a corporation of Michigan
Filed Apr. 28, 1967, Ser. No. 634,747
Int. Cl. B21d *3/00;* B23p *19/04*
U.S. Cl. 72—367                                    8 Claims

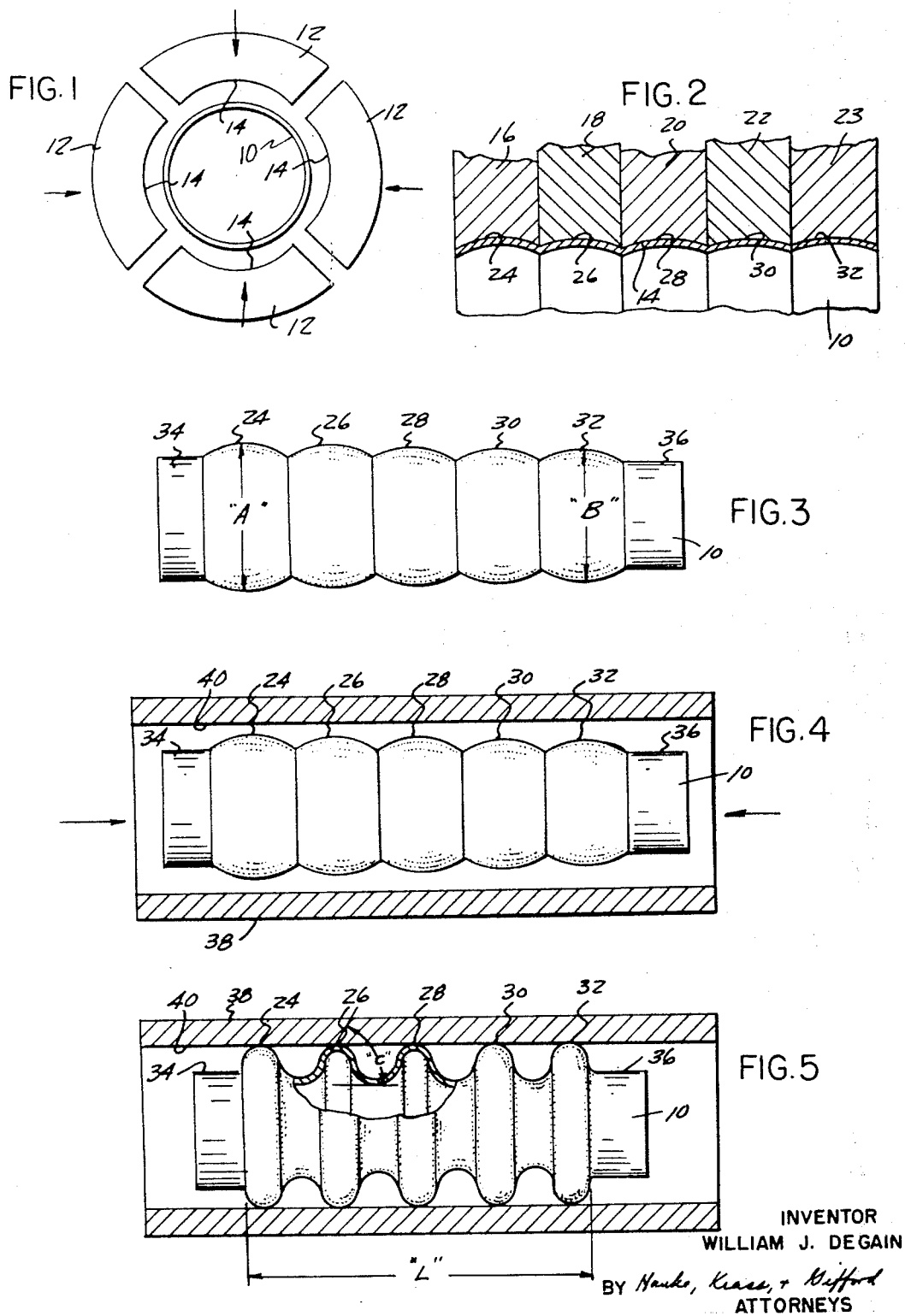

ABSTRACT OF THE DISCLOSURE

A method for making a tubular section having a sidewall with a varying diameter in the direction of its length. A radial, compressive force is applied to the circumferential wall surface of a tubular blank to deform the wall into a patterned impression. The blank is then supported in a die cavity having a bore with a diameter greater than the blank. An axial compressive force applied to the ends of the blank forces the ends toward one another and radially enlarges selected sections of the blank to the diameter of the die cavity.

Background of the invention

*Field of the invention.*—This invention relates to a method for making a tubular product having a variable cross section in the direction of its length and more particularly to a method wherein a tubular blank is pre-compressed by a radial force applied to its outer wall surface and then partially collapsed by an axial compressive force applied to its ends.

*Description of the prior art.*—Tubular structural members having controlled collapsing characteristics are being widely employed as a safety feature in modern automotive vehicles. Such members are employed with the steering shaft assembly where they transmit normal axial and torsional loads from the steering wheel to the components of the steering assembly. However, when a predetermined compressive axial force is applied to opposite end sections of the tube, the ends move toward one another at a controlled rate as the wall collapses into a predictable configuration.

The object of utilizing structural members of this character is to absorb the energy of impact forces imposed on the vehicle into the work of deforming the tube walls so that the driver experiences a cushioned deceleration against a yielding structural member instead of being injured against a non-yielding member.

The general approach to providing a tubular member having controlled collapsing characteristics is to form the tube wall into a longitudinal series of individually collapsible segments arranged to collapse in a progressive sequence as opposed to a random sequence. Generally, these collapsible segments each comprise an annular ridge having a major diameter connected to adjacent ridges by an annular valley. The ridges are perforated with a pattern chosen to control the magnitude of the circumferential or hoop stresses developed in the ridges as the tube ends move toward one another under the influence of a collapsing force.

One method that has been suggested for forming a tube having the aforementioned characteristics comprises supporting a tubular blank about its axis and applying a compressive, deforming force on its outer circumferential wall surface by a series of converging die sections arranged to deform the tube wall in a single die stroke. The problem with this method results from the uneven metal flow produced by the compressive forces and manifests itself in either a thinning or a rupture of the tube wall. The radial forces forming the ridges produce longitudinal stresses in the tube walls tending to shorten the length of the tube. However, the die faces and the tube supporting means produce opposing longitudinal forces restraining the tube from shortening sufficiency to accommodate the shortening stresses. The resulting stress concentrations produce an uneven metal flow and rupture of the tube wall.

The preferred method of the present invention contemplates a two-step compression process for forming a tubular section having the aforementioned collapsing characteristics.

Summary

The preferred method of practicing the present invention, which will be subsequently described in detail, comprises deforming the wall of a blank by a radial compressive force and then partially collapsing the blank by an axial compressive force. The first step employs a series of converging die sections arranged to apply a compressive force on the circumferential surface of the tube wall to form a series of shallow annular ridges in a single die stroke. The force applied by the dies is chosen so that it is sufficient to deform the tube wall without producing an uneven metal flow or thinning of the wall.

Preferably, the die sections each comprise a laminated unit consisting of a series of sections joined together to form a continuous die face. Each die face is contoured so that the tube wall is shaped into a series of ridges having a progressively decreasing diameter.

The precompressed tubular blank is then arranged in a die cavity having a cylindrical side wall. The diameter of the die cavity is greater than the diameter of the ridges of the tubular blank and corresponds to the major diameter of the completed tubular member. A compressive axial force applied to the precompressed tubular blank forces the tube ends toward one another. As the tubular blank shortens, the preformed ridges are progressively and radially enlarged to a final diameter.

It is therefore an object of the present invention to reduce the cost of manufacturing tubular products having sections with dissimilar diameters by providing a method wherein a radial compressive force is applied to the circumferential surface of a tubular blank to impress the tube wall into a predetermined pattern, arranging the precompressed tubular blank in a die cavity having a cylindrical side wall with a diameter corresponding to the major diameter of the finished tubular product and then applying an axial compressive force to the tubular blank so that sections thereof are enlarged to the diameter of the cavity wall as the opposite ends of the tubular blank approach one another.

It is another object of the present invention to provide a method of making a structural tubular member which transmits axial forces less than a predetermined force and collapses in an energy-absorbing manner under the influence of a predetermined axial force, the method comprising a two-step compression process including precompressing a series of shallow annular ridges in a tubular blank by the application of a radial compressive force on the tube wall and then applying an axial compressive force on the ends of the tubular blank to partially collapse the precompressed ridges.

Still further objects and advantages of the present invention will readily occur to one skilled in the art to which the invention pertains upon reference to the following detailed description.

Description of the drawings

The description refers to the accompanying drawing in which like reference characters refer to like parts throughout the several views and in which:

FIG. 1 is a view showing the precompression step which forms the initial step of the preferred method;

FIG. 2 is a fragmentary longitudinal sectional view of the tubular blank being deformed by a laminated die during the pre-compression step;

FIG. 3 is a view of the preformed tubular blank resulting from the pre-compression step;

FIG. 4 is a view illustrating the preformed tubular blank arranged within the die cavity prior to application of the axial compression force; and FIG. 5 illustrates the tube partially collapsed by the axial force.

Description of the preferred embodiments

Now referring to the drawings, FIG. 1 illustrates a tubular section 10 preferably having a symmetrical cross section throughout its length and supported for engagement by a plurality of die sections 12. The die sections 12 are arranged to converge toward the longitudinal axis of the tubular blank 10 so that the die faces 14 of the die sections 12 engage substantially the entire circumferential surface of the tubular blank 10.

As can best be seen in FIG. 2, each die section 12 preferably comprises a series of laminated sections such as 16, 18, 20, 22 and 23 joined together to form a continuous die face.

The inner surface of tubular section 10 opposite the outer circumferential surface engaged by the die sections 12 is supportd so that the wall of the tube is deformed to assume the contour of the die faces 14.

The laminated sections comprising each die section 12 have individually contoured die faces to deform the wall of the tubular blank 10 into a series of annular ridges 24, 26, 28, 30, and 32. The dies are preferably shaped so that the major diameter of each successive ridge is progressively reduced from one end of the tube toward the other. Although the laminated sections are illustrated as having a uniform thickness, they could be provided with a progressively reduced thickness so that the longitudinal radius of each successive ridge is progressively reduced.

It is to be understood that the radial forces applied by the die sections 12 on the tubular blank 10 are sufficient to impress the pattern of ridges in the tube wall, but are insufficient to produce a significantly non-uniform metal displacement or thinning of the wall thickness.

The preferred tubular blank 10 assumes the general shape illustrated in FIG. 3, and includes a pair of cylindrical, undeformed end sections 34 and 36 connected by series of annular ridges 24, 26, 28, 30 and 32. The diameter of the peak of each successive ridge is gradually reduced from the end section 34 to the end section 36. Thus the major diameter of ridge 24 indicated by the letter "A" is greater than the diameter of ridge 32 illustrated by the letter "B".

Referring to FIGURE 4, the precompressed tubular blank 10 is then arranged in die 38 having cylindrical cavity 40. A compressive axial force is applied to the ends 34 and 36 of the blank. As can be seen in FIG. 5, this compressible axial force moves the end sections 34 and 36 toward one another so that the ridges 24, 26, 28, 30 and 32 progressively and radially enlarge until the peaks of the ridges assume the diameter of the cavity wall 40.

This controlled partial collapse produces a completed product having a final predetermined length indicated at "L". The ridges are collapsed until the annular half of each ridge forms a predetermined angle generally indicated at "C" with respect to their original undeformed position.

Thus, it can be seen that I have described in detail an economical method to make a tubular member having controlled collapsing characteristics by essentially a two-step compression process.

Although I have described but one preferred embodiment of my invention, it is to be understood that various changes and revisions can be made therein without departing from the spirit of the invention as expressed in the scope of the appended claims.

I claim:

1. A method for making a tubular product having a series of partially collapsed annular ridges, comprising the steps of:

forming a series of annular ridges in the wall of an elongated metal tubular member to form a tube of a first length, the ridges being formed so as to be collapsed as the tube is shortened by the application of a longitudinally directed force on the tube; and applying a longitudinal force at opposite ends of the series of ridges while each ridge in the series is unconstrained for deformation in any direction, the force being sufficient to shorten the tube toward a second length by partially collapsing at least certain ridges of the series.

2. The method as defined in claim 1, in which the ridges are formed so as to be annularly enlarged as the tube is shortened toward its second length.

3. The method as defined in claim 2, in which the tube is shortened toward its second length in a die cavity having a wall formed to provide an annular constraint on each ridge as it is enlarged to a predetermined diameter.

4. The method as defined in claim 2, in which the tube is shortened in a die cavity having a cylindrical wall with a length substantially as long as the length of the series of ridges, and a diameter greater than the ridges, and each ridge in the series is annularly enlarged to the diameter of the cylindrical wall as the tube is shortened toward its second length.

5. The method as defined in claim 2, in which the tube wall is formed such that the ridges are partially collapsed in a predetermined sequence as the tube is shortened toward its second length.

6. The method as defined in claim 2, in which the tube wall is preformed with certain of the ridges having a greater diameter than other of the ridges and in such a manner that some of the ridges are more fully collapsed than other of the ridges as the tube is shortened toward its second length.

7. The method as defined in claim 5, in which each ridge is annularly enlarged as it is collapsed, and the tube is disposed in a die cavity having a wall formed to provide an annular restraint on each ridge as it is enlarged to a predetermined diameter.

8. A method for making a tubular product having predictable energy-absorbing properties when subjected to a collapsing, longitudinal force, comprising the steps of:

forming the wall of an elongated metal tube to provide a series of ridges each having a greater diameter than the tube's undeformed diameter, and with certain of the ridges having a greater diameter than other of the ridges;

disposing the tube in a die cavity with a cylindrical wall having a diameter greater than the ridges, and a length at least as long as the length of the series of ridges; and applying a longitudinal force on opposite ends of the series of ridges while each ridge in the series is unconstrained for deformation in any direction, the longitudinal force being sufficient to shorten the tube from a first length toward a second, predetermined length by annularly enlarging each of the ridges to the diameter of the cavity in a predetermined sequence.

References Cited

UNITED STATES PATENTS

| | | | |
|---|---|---|---|
| 425,022 | 4/1890 | Burkhardt | 72—367 |
| 1,980,264 | 11/1934 | Giesler | 72—367 |
| 2,954,064 | 9/1960 | DeMers | 29—454 |
| 3,012,604 | 12/1961 | Zieg | 72—402 |

CHARLES W. LANHAM, Primary Examiner

LOWELL A. LARSON, Assistant Examiner

U.S. Cl. X.R.

29—454

PO-1050
(5/69)

UNITED STATES PATENT OFFICE
CERTIFICATE OF CORRECTION

Patent No. 3,457,762  Dated July 29, 1969

Inventor(s) William J. DeGain

It is certified that error appears in the above-identified patent and that said Letters Patent are hereby corrected as shown below:

Please change the assignee from Arma Corporation to Koppy Tool Corporation, in accordance with the Assignment recorded on April 28, 1967, Reel No. 1934, Frame No. 510.

SIGNED AND
SEALED
FEB 17 1970

(SEAL)
Attest:

Edward M. Fletcher, Jr.
Attesting Officer

WILLIAM E. SCHUYLER, JR.
Commissioner of Patents